United States Patent
Lu et al.

(10) Patent No.: US 11,943,064 B2
(45) Date of Patent: Mar. 26, 2024

(54) METHODS AND DEVICES FOR TRANSMISSION OF FEEDBACK INFORMATION AND DATA RETRANSMISSION

(71) Applicant: GUANGDONG OPPO MOBILE TELECOMMUNICATIONS CORP., LTD., Guangdong (CN)

(72) Inventors: Qianxi Lu, Guangdong (CN); Zhenshan Zhao, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/196,980

(22) Filed: Mar. 9, 2021

(65) Prior Publication Data
US 2021/0218510 A1 Jul. 15, 2021

Related U.S. Application Data

(63) Continuation of application No. PCT/CN2018/104909, filed on Sep. 10, 2018.

(51) Int. Cl.
*H04L 1/1867* (2023.01)
*H04W 4/46* (2018.01)
(Continued)

(52) U.S. Cl.
CPC ............ *H04L 1/1867* (2013.01); *H04W 4/46* (2018.02); *H04W 72/20* (2023.01); *H04W 4/44* (2018.02)

(58) Field of Classification Search
CPC .... H04L 1/1867; H04L 1/1861; H04W 76/23; H04W 72/02; H04W 72/1278; H04W 4/46; H04W 4/44; H04W 76/28; H04W 72/20
See application file for complete search history.

(56) References Cited

U.S. PATENT DOCUMENTS

2014/0295832 A1\* 10/2014 Ryu ...................... H04W 48/16
455/434
2017/0347394 A1 11/2017 Yasukawa et al.
(Continued)

FOREIGN PATENT DOCUMENTS

CN 103731245 A 4/2014
CN 103825687 A 5/2014
(Continued)

OTHER PUBLICATIONS

Ericsson, "On the support of sidelink unicast, groupcast and broadcast", 3GPP TSG-RAN WG1 Meeting #94, R1-1809301, Aug. 2018, 8 pages.
EPO, Partial Supplementary European Search Report for EP Application No. 18933272.9, dated Jul. 19, 2021.
(Continued)

Primary Examiner — Mandish K Randhawa
(74) Attorney, Agent, or Firm — Hodgson Russ LLP

(57) ABSTRACT

Methods and devices for transmission of feedback information and methods and devices for data retransmission are provided. A method for transmission of feedback information includes the following. A second terminal device send first data to a first terminal device through device to device (D2D) communication. The second terminal device obtains a retransmission resource. The second terminal device retransmit the first data to the first terminal device on the retransmission resource through D2D communication, according to feedback information of the first terminal device responsive to the first data.

19 Claims, 6 Drawing Sheets

(51) Int. Cl.
*H04W 72/20* (2023.01)
*H04W 4/44* (2018.01)

(56) References Cited

U.S. PATENT DOCUMENTS

2018/0091265 A1 3/2018 Liu et al.
2018/0324718 A1* 11/2018 Serrano ................ H04W 76/23

FOREIGN PATENT DOCUMENTS

| | | |
|---|---|---|
| CN | 104080170 | 10/2014 |
| WO | 2016131344 A1 | 8/2016 |
| WO | 2018059282 A1 | 4/2018 |

OTHER PUBLICATIONS

Qualcomm et al., V2V Work Item Completion, 3GPP Rel-14, RP-161788, Sep. 19-22, 2016.
WIPO, International Search Report for International Application No. PCT/CN2018/104909, dated Mar. 28, 2019.
EPO, Extended European Search Report for Application No. 18933272.9, dated Oct. 25, 2021.
IPI, Office Action for IN Application No. 202117010205, dated Feb. 1, 2022.
EPO, Communication for EP Application No. 18933272.9, dated Jun. 21, 2022.
CNIPA, First Office Action for CN Application No. 202110265448.6, dated Jul. 29, 2022.
CNIPA, Dismissing Decision for CN Application No. 202110265448.6, Jan. 13, 2023.

* cited by examiner

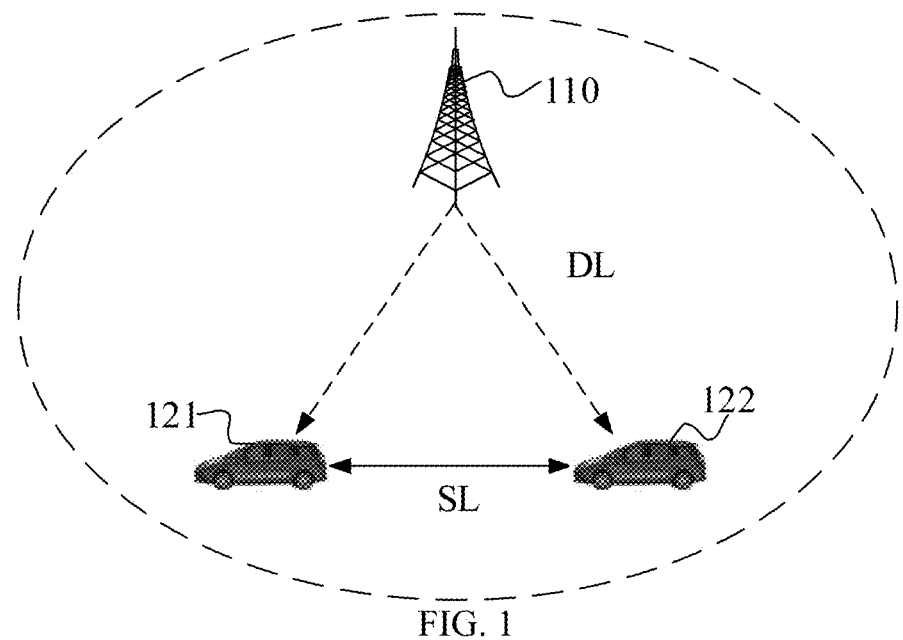
FIG. 1
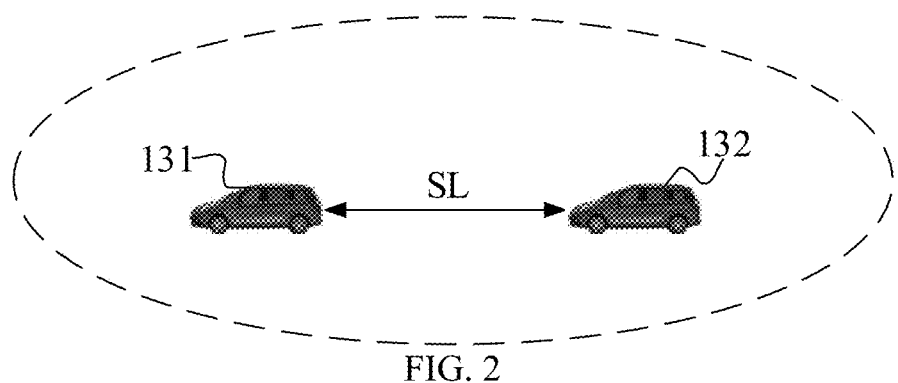
FIG. 2
A FIRST TERMINAL DEVICE OBTAINS A FEEDBACK RESOURCE ACCORDING TO FIRST INDICATION INFORMATION, WHERE THE FEEDBACK RESOURCE IS USED FOR CARRYING FEEDBACK INFORMATION RESPONSIVE TO A SECOND TERMINAL DEVICE — 310
THE FIRST TERMINAL DEVICE SENDS FEEDBACK INFORMATION TO THE SECOND TERMINAL DEVICE ON THE FEEDBACK RESOURCE — 320
FIG. 3

METHODS AND DEVICES FOR TRANSMISSION OF FEEDBACK INFORMATION AND DATA RETRANSMISSION

CROSS REFERENCE TO RELATED APPLICATION(S)

This application is a continuation of International Application No. PCT/CN2018/104909, filed on Sep. 10, 2018, the entire disclosure of which is incorporated herein by reference.

TECHNICAL FIELD

This disclosure relates to the field of communication technology, and more particularly to methods and devices for transmission of feedback information and methods and devices for data retransmission.

BACKGROUND

An Internet of vehicles (IoV) system adopts a long term evaluation vehicle to vehicle (LTE V2V)-based sidelink (SL) transmission technology. Different from a traditional LTE system in which communication data are received or sent via a base station, the IoV system adopts a direct terminal-to-terminal communication, and therefore has a higher spectrum efficiency and lower transmission delay.

In the IoV system, data sent by a first terminal device can be directly sent to a second terminal device without routing through a network device. Data can be directly transmitted between the first terminal device and the second terminal device. How to ensure reliability of data transmission in the IoV system has become a problem to be solved.

SUMMARY

Implementations provide methods and devices for transmission of feedback information and methods and devices for data retransmission.

In a first aspect, a method for data retransmission is provided. The method includes the following. A second terminal device sends first data to a first terminal device through D2D communication. The second terminal device obtains a retransmission resource. The second terminal device retransmits the first data to the first terminal device on the retransmission resource through D2D communication, according to feedback information of the first terminal device responsive to the first data.

In a second aspect, a terminal device is provided. The terminal device includes at least one processor, a transceiver, a memory storing instructions which, when executed by the at least one processor, cause the transceiver to: send a first message to a first terminal device through device to device (D2D) communication, and send first indication information to the first terminal device, wherein the first indication information is indicative of a feedback resource, and the feedback resource is a resource used for sending, by the first terminal device, to the terminal device feedback information responsive to the first message through D2D communication.

In a third aspect, a non-transitory computer readable storage medium is provided. The non-transitory computer readable storage medium is configured to store computer programs which, when executed, are operable with a computer to: send first data to a first terminal device through device to device (D2D) communication; obtain a retransmission resource; retransmit the first data to the first terminal device on the retransmission resource through D2D communication, according to feedback information of the first terminal device responsive to the first data.

BRIEF DESCRIPTION OF THE DRAWINGS

FIG. 1 is a schematic diagram of an IoV communication mode according to implementations.

FIG. 2 is a schematic diagram of an IoV communication mode according to other implementations.

FIG. 3 is a schematic flowchart of a method for transmission of feedback information according to implementations.

DETAILED DESCRIPTION

Figure 4:
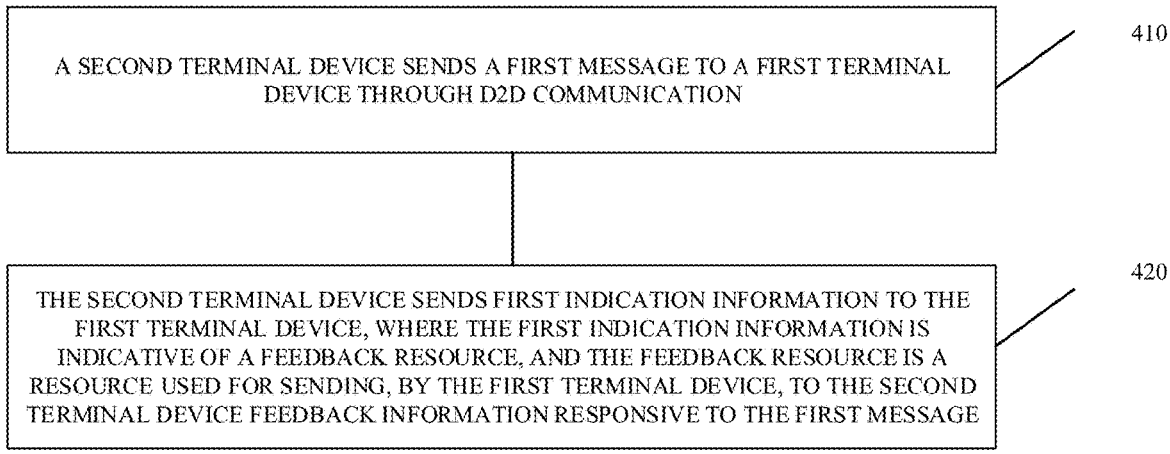
FIG. 4 is a schematic flowchart of a method for transmission of feedback information according to other implementations.

Technical solutions of implementations will be described in connection with the accompanying drawings.

Implementations herein are applicable to any terminal-to-terminal communication framework, for example, V2V communication, vehicle to everything (V2X) communication, device to device (D2D) communication, etc.

A terminal device of implementations may be any device or apparatus equipped with a physical layer and a media access control (MAC) layer. The terminal device may also be referred to an access terminal, for example, a user equipment (UE), a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, an in-vehicle device, a wearable device, or the like. In implementations herein, a vehicle user equipment (VUE) is taken as an example for description, but the disclosure is not limited in this regard.

Implementations herein are adapted to transmission mode 3 and transmission mode 4 defined in 3rd generation partnership project (3GPP) Rel-14.

FIG. 1 is a schematic diagram of mode 3 according to implementations. FIG. 2 is a schematic diagram of mode 4 according to implementations.

In transmission mode 3 illustrated in FIG. 1, transmission resources of a VUE (namely VUE 121 and VUE 122) are allocated by a base station 110. The VUE can transmit data on an SL by using a resource allocated by the base station 110. The resource allocated by the base station 110 to a terminal device may be a resource used for a single transmission or a resource used for semi-static transmission.

In transmission mode 4 illustrated in FIG. 2, the VUE (namely VUE 131 and VUE 132) can adopt a "sensing+reservation" transmission mode. The VUE can autonomously select, from SL resources, a transmission resource to transmit data.

The following will take the VUE 131 as an example for description.

The VUE 131 can acquire, through sensing, an available transmission resource set from a resource pool, and then randomly select a resource from the transmission resource set to transmit data.

Since a service in an IoV system is periodic, the VUE 131 can also adopt a semi-static transmission mode, that is, the VUE 131 can select a transmission resource and continuously use the selected transmission resource in multiple transmission periods, which can reduce probability of resource reselection and probability of resource collision.

In addition, the VUE 131 can carry, in control information of the current transmission, information indicative of a resource reserved for a next transmission, such that other terminal devices (such as the VUE 132) can determine, by detecting the control information, whether the resource has been reserved or used, thereby reducing probability of resource collision.

According to implementations, a first terminal device can transmit data directly to a second terminal device without routing through a network device. However, in a D2D scenario, how to ensure reliability of data transmission has become a problem to be solved.

FIG. 3 is a schematic flowchart of a method for transmission of feedback information according to implementations, which is conducive to reliability of data transmission. The method illustrated in FIG. 3 can be performed by a terminal device. A first terminal device illustrated in FIG. 3 may be the VUE 121 illustrated in FIG. 1, and a second terminal device illustrated in FIG. 3 may be the VUE 122 illustrated in FIG. 1. Similarly, the first terminal device illustrated in FIG. 3 may be the VUE 131 illustrated in FIG. 2, and the second terminal device illustrated in FIG. 3 may be the VUE 132 illustrated in FIG. 2. The method illustrated in FIG. 3 includes some or all of the following operations.

At block 310, the first terminal device obtains a feedback resource, where the feedback resource is used for carrying feedback information responsive to the second terminal device.

The feedback information may be fed back by the first terminal device responsive to a first message sent by the second terminal device.

In some implementations, the first message may be data information sent by the second terminal device to the first terminal device, or may be a reference signal or control information sent by the second terminal device to the first terminal device. The reference signal may be, for example, a channel state information reference signal (CSI-RS).

When the feedback information is responsive to data sent by the second terminal device, the data may be initially-transmitted data or retransmitted data.

At block 320, the first terminal device sends the feedback information to the second terminal device on the feedback resource.

"The first terminal device sends the feedback information to the second terminal device" means that the first terminal device sends the feedback information directly to the second terminal device without routing through a network device.

"The first terminal device sends the feedback information directly to the second terminal device" may be that the first terminal device sends the feedback information to the second terminal device through D2D communication. In some situations, "D2D communication" can also mean that the first terminal device sends the feedback information to the second terminal device through V2V communication, or the first terminal device sends the feedback information to the second terminal device on an SL.

By means of the technical solutions of implementations, when the first terminal device communicates with the second terminal device through D2D communication, the first terminal device can feed back to the second terminal device according to the first message sent by the second terminal device, which is beneficial for the second terminal device to make a proper communication decision according to the feedback information, thereby improving reliability of communication.

FIG. 4 is a schematic flowchart of a method for transmission of feedback information according to other implementations. The method illustrated in FIG. 4 includes some or all of the following operations.

At block 410, a second terminal device sends a first message to a first terminal device.

"The second terminal device sends the first message to the first terminal device" can be that the second terminal device sends the first message to the first terminal device through D2D communication.

In some situations, "D2D communication" may also be comprehended as V2V communication or SL communication.

At block 420, the second terminal device sends first indication information to the first terminal device, where the first indication information is indicative of a feedback resource.

The feedback resource is used for carrying feedback information of the first terminal device responsive to the second terminal device.

The feedback resource may be a resource used for sending, by the first terminal device, to the second terminal device feedback information responsive to the first message through D2D communication.

Figure 5:
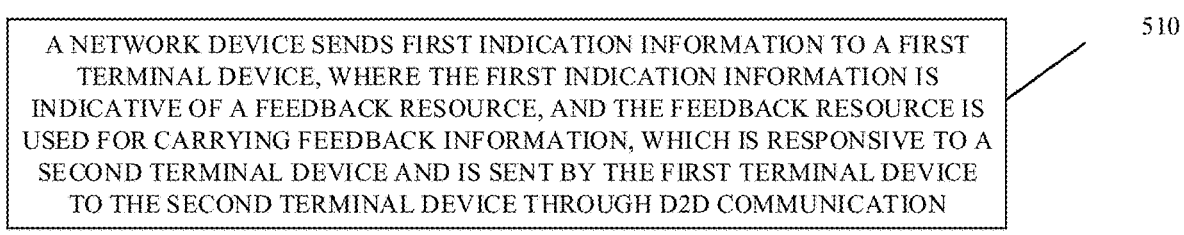
FIG. 5 is a schematic flowchart of a method for transmission of feedback information according to other implementations.

FIG. 5 is a schematic flowchart of a method for transmission of feedback information according to other implementations. The method illustrated in FIG. 5 includes some or all of the following operations.

At block 510, a network device sends first indication information to a first terminal device, where the first indication information is indicative of a feedback resource, and the feedback resource is used for carrying feedback information, which is responsive to a second terminal device and is sent by the first terminal device to the second terminal device through D2D communication.

The feedback information, which is sent by the first terminal device to the second terminal device, may be responsive to a first message sent by the second terminal device.

In some situations, "D2D communication" may also be comprehended as V2V communication or SL communication.

The following will describe in detail the methods illustrated in FIG. 3, FIG. 4, and FIG. 5.

In some implementations, the feedback information may be, for example, at least one of: acknowledgement (ACK) information, negative acknowledgment (NACK) information, channel quality information, power control information, and a multiple antenna scheme.

The ACK information/NACK information may be feedback responsive to the data information sent by the second terminal device. The first terminal device can send the feedback information to the second terminal device according to reception of data.

The channel quality information, the power control information, or the multiple antenna scheme may be feedback information which is sent by the first terminal device to the second terminal device according to reception of the first message sent by the second terminal device.

The channel quality information may be sent by the first terminal device to the second terminal device according to reception quality of the first message.

The power control information may be fed back by the first terminal device to the second terminal device according to a reception power of the first message. The second terminal device can adjust a transmission power of a signal according to the power control information.

The multiple antenna scheme may be sent by the first terminal device to the second terminal device according to reception of the first message. The multiple antenna scheme may include, for example, whether a precoding matrix is required for encoding, the manner of precoding, whether transmit diversity is adopted and/or whether space multiplexing is adopted, etc.

The manner of precoding may be various, for example, codebook-based precoding and non-codebook based precoding.

The manner of transmit diversity may be various, for example, space frequency block code (SFBC), frequency switched transmit diversity (FSTD), time switched transmit diversity (TSTD), or the like.

The manner in which first terminal device obtains the feedback resource is not limited herein. For example, the first terminal device can obtain the feedback resource through autonomous resource selection. For another example, the first terminal device can obtain the feedback resource according to indication information.

In case of autonomous resource selection, the first terminal device obtains the feedback resource based on resource contention. The first terminal device, after success in resource contention, can use the feedback resource, which is successfully contended, to send the feedback information.

The manner of resource contention may be various. For example, a listen before talk (LBT) mode may be adopted for resource contention. When the first terminal device senses that a transmission resource is in an idle state, the first terminal device can use the transmission resource to send the feedback information. When the first terminal device senses that the transmission resource is occupied, the first terminal device cannot use the transmission resource to send the feedback information. For another example, resource contention can be carried out in the manner of obtaining resources in IoV mode 4 of Rel-14 and Rel-15. When the first terminal device senses that a transmission resource is available, the first terminal device can use the transmission resource to send the feedback information. When the first terminal device senses that the transmission resource is occupied, the first terminal device cannot use the transmission resource to send the feedback information.

"The first terminal device obtains the feedback resource" may be that the first terminal device obtains the feedback resource according to the first indication information.

In some implementations, the first indication information can be indicative of the feedback resource. The first terminal device can send the feedback information on the feedback resource. In other implementations, the first indication information can be indicative of a feedback resource set. The first terminal device can select the feedback resource from the feedback resource set to send the feedback information.

In some implementations, the first indication information may be indicative of time information and/or frequency information of the feedback resource.

The following will describe in detail the manner in which the first terminal device obtains the feedback resource according to the first indication information.

In some implementations, the first terminal device can receive the first indication information sent by the second terminal device. The first indication information is indicative of an available feedback resource. The first terminal device can determine the feedback resource according to the first indication information.

In other implementations, before the second terminal device sends the first indication information to the first terminal device, the second terminal device can receive second indication information sent by the network device, where the second indication information is indicative of an available feedback resource, and the second terminal device can generate the first indication information according to the second indication information. Then the second terminal device can send the first indication information to the first terminal device.

It can be understood that, the first indication information and the second indication information can both be indicative of a feedback resource set. Alternatively, the second indication information is indicative of an available feedback resource set, and the first indication information is indicative of a feedback resource in the available feedback resource set. In this scenario, the second terminal device can select a feedback resource from the feedback resource set indicated by the second indication information, to generate the first indication information.

As an example, the network device can send the second indication information to the second terminal device while sending third indication information to the second terminal device, where the third indication information is indicative of a resource used for sending, by the second terminal device, the first message to the first terminal device. In other words, the feedback resource indicated by network device to the second terminal device may be indicated by the network device in control information which is indicative of a resource used for sending the first message by the second terminal device.

In other implementations, the first terminal device can pre-configure the first indication information.

For example, the first terminal device can pre-configure frequency resource locations and/or time resource locations of feedback resources or of the feedback resource set. The first terminal device can select a feedback resource from the pre-configured feedback resources or the feedback resource set.

For another example, the first terminal device may pre-configure the feedback resource. The first terminal device can send the feedback information on the pre-configured feedback resource.

In other implementations, the first terminal device can receive the first indication information sent by the network device. The first terminal device can obtain the feedback resource according to the first indication information.

The first indication information may be sent by the network device directly to the first terminal device. Alternatively, the first indication information may be sent by the network device to the first terminal device after the first terminal device sends a resource request message to the network device.

For example, the first terminal device, upon receiving data sent by the second terminal device, can send the resource request message to the network device. In response to the resource request message, the network device sends the first indication information to the first terminal device.

The resource request message may be used for requesting the feedback resource. The network device, upon receiving the resource request message, can send to the first terminal device the first indication information indicative of the feedback resource.

In some implementations, the resource request message includes time information and/or frequency information of a resource requested by the first terminal device. In this case, the first indication information sent by the network device may be an ACK message/NACK message, where the ACK message indicates that the resource requested by the first terminal device can be used for sending the feedback information, and the NACK message indicates that the resource requested by the first terminal device cannot be used for sending the feedback information. The first terminal device, upon receiving the NACK message, can resend the resource request message to the network device, or the network device can directly indicate an available feedback resource to the first terminal device.

In some implementations, the resource request message is carried in a physical uplink control channel (PUCCH) (such as uplink control information (UCI) signaling in the PUCCH), a MAC control element (MAC CE), or radio resource control (RRC) signaling.

The first indication information and the second indication information can both be indicative of the time information and/or frequency information of the feedback resource.

When the first indication information indicates the time information of the feedback resource, the frequency information of the feedback resource may be a default frequency. The default frequency may be, for example, a frequency specified in a protocol, or a frequency agreed between the first terminal device and the second terminal device, or a frequency at which the first terminal device receives the first message. The first terminal device can send the feedback information at a time indicated by the first indication information and at the default frequency.

When the first indication information indicates the frequency information of the feedback resource, the time information of the feedback resource may be a default time. The default time may be, for example, a $K^{th}$ subframe subsequent to receiving, by the first terminal device, the first message sent by the second terminal device. The first terminal device can send the feedback information at a frequency indicated by the first indication information and at the default time. K is a positive integer.

The value of K may be an value agreed between the first terminal device and the second terminal device, or may be a value indicated by the second terminal device to the first terminal device.

For example, if the first terminal device receives the first message in an $N^{th}$ subframe, the first terminal device can send the feedback information responsive to the first message in an $(N+K)^{th}$ subframe, where N is a positive integer, and the value of K may be, for example, 4.

The first indication information may implicitly indicate the feedback resource. For example, the first terminal device can determine, according to time and frequency at which the first message is received, time information and frequency information for sending the feedback information.

For example, the first terminal device can send the feedback information in an $(N+4)^{th}$ subframe at a frequency at which the first message is received.

The first indication information can be indicative of a starting position of a time-domain resource and the length of the time-domain resource. The first terminal device can send the feedback information on the time-domain resource indicated by the first indication information.

Alternatively, the first indication information can be indicative of a starting position of a frequency-domain resource and the length of the frequency-domain resource. The first terminal device can send the feedback information on the frequency-domain resource indicated by the first indication information.

In some implementations, the feedback resource indicated by the first indication information takes time and/or frequency of the second terminal device as a synchronization reference. In other implementations, the feedback resource indicated by the first indication information takes time and/or frequency of the network device as a synchronization reference. In other implementations, the feedback resource indicated by the first indication information takes time and/or frequency of a global navigation satellite system (GNSS) as a synchronization reference.

For example, the starting position of the time-domain resource may take the time of the second terminal device as a time reference. Alternatively, the starting position of the time-domain resource may take the time of the network device as a time reference. Alternatively, the starting position of the time-domain resource may take the time of the GNSS as a time reference.

For another example, the starting position of the frequency-domain resource may take the frequency of the second terminal device as a reference. Alternatively, the starting position of the frequency-domain resource may take the frequency of the network device as a reference. Alternatively, the starting position of the frequency-domain resource may take the frequency of the GNSS as a reference.

In some implementations, before the first terminal device sends the feedback information to the second terminal device on the feedback resource, the first terminal device can obtain the feedback resource through autonomous resource selection.

The manner of autonomous resource selection may be, for example, resource contention. The first terminal device can use the feedback resource to send the feedback information only when resource contention succeeds. In other words, the first terminal device, after obtaining the feedback resource according to the first indication information, needs to contend for the feedback resource, and the first terminal device can use the feedback resource to send the feedback information only when contention succeeds.

The manner of resource contention may be various. For example, an LBT mode may be adopted for resource contention. When the first terminal device senses that a feedback resource is in an idle state, the first terminal device can use the feedback resource to send the feedback information. When the first terminal device senses that the feedback resource is occupied, the first terminal device cannot use the feedback resource to send the feedback information. For another example, resource contention can be carried out in the manner of obtaining resources in IoV mode 4 of Rel-14 and Rel-15. When the first terminal device senses that a transmission resource is available, the first terminal device can use the transmission resource to send the feedback information. When the first terminal device senses that the transmission resource is occupied, the first terminal device cannot use the transmission resource to send the feedback information.

"The second terminal device receives the feedback information sent by the first terminal device" may be that the second terminal device senses, on each of multiple feedback resources, whether the first terminal device sends the feedback resource to the second terminal device.

The multiple feedback resources may refer to a feedback resource set which can be used for sending the feedback information.

"The first terminal device sends the feedback information to the second terminal device" can be comprehended as follows. The first terminal device may send the feedback information only after receiving the first message from the second terminal device, or may send the feedback information to the second terminal device periodically.

Figure 6:
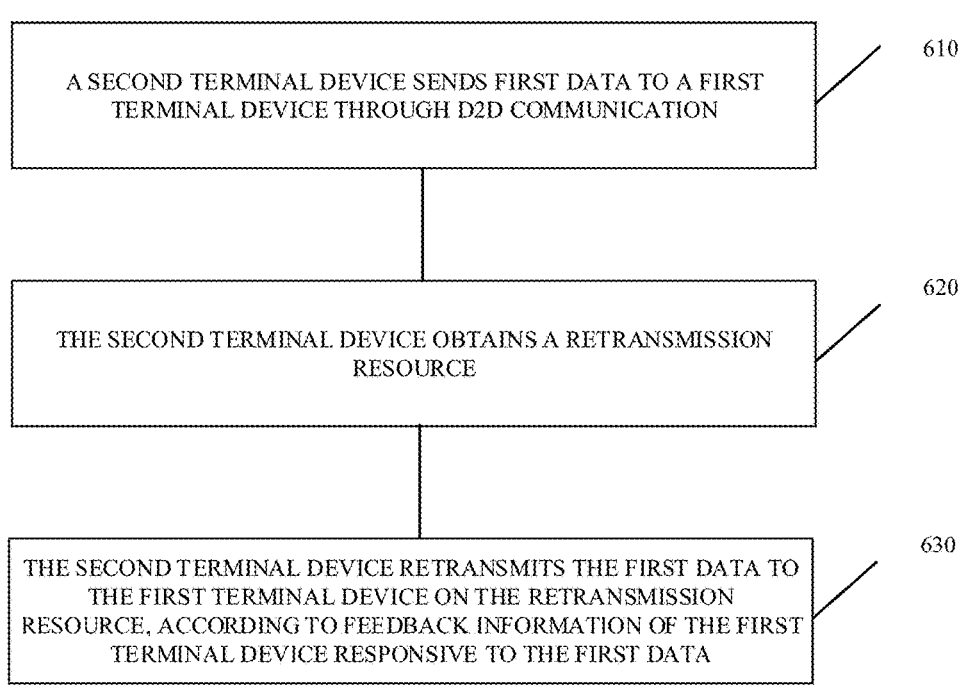
FIG. 6 is a schematic flowchart of a method for data retransmission according to implementations.

FIG. 6 is a schematic flowchart of a method for data retransmission according to implementations. The method illustrated in FIG. 6 can be performed by a terminal device. A first terminal device illustrated in FIG. 6 may be the VUE 121 illustrated in FIG. 1, and a second terminal device illustrated in FIG. 6 may be the VUE 122 illustrated in FIG. 1. Similarly, the first terminal device illustrated in FIG. 6 may be the VUE 131 illustrated in FIG. 2, and the second terminal device illustrated in FIG. 6 may be the VUE 132 illustrated in FIG. 2. The method illustrated in FIG. 6 includes some or all of the following operations.

At block 610, the second terminal device sends first data to the first terminal device.

"The second terminal device sends the first data to the first terminal device" means that the second terminal device sends the first data directly to the first terminal device without routing through a network device.

"The second terminal device sends the first data directly to the first terminal device" may be that the second terminal device sends the first data to the first terminal device through D2D communication. In some situations, "D2D communication" can also be comprehended as V2V communication or SL communication.

The first data may be initially-transmitted data or retransmitted data.

At block 620, the second terminal device obtains a retransmission resource.

Information of the retransmission resource may include time information and/or frequency information of the retransmission resource.

At block 630, the second terminal device retransmits the first data to the first terminal device on the retransmission resource, according to feedback information of the first terminal device responsive to the first data.

"The second terminal device retransmits the first data to the first terminal device" means that the second terminal device retransmits the first data to the first terminal device through D2D communication.

In some situations, "D2D communication" can also be comprehended as V2V communication or SL communication.

By means of the technical solutions of implementations, when the first terminal device communicates with the second terminal device through D2D communication, data retransmission by the second terminal device to first terminal device is performed according to feedback of the first terminal device responsive to the first data, instead of adopting a fixed number of retransmissions. As such, it is beneficial for the second terminal device to determine a proper retransmission scheme, to ensure that the first terminal device can correctly receive the first data, which can improve reliability of data transmission.

Figure 7:
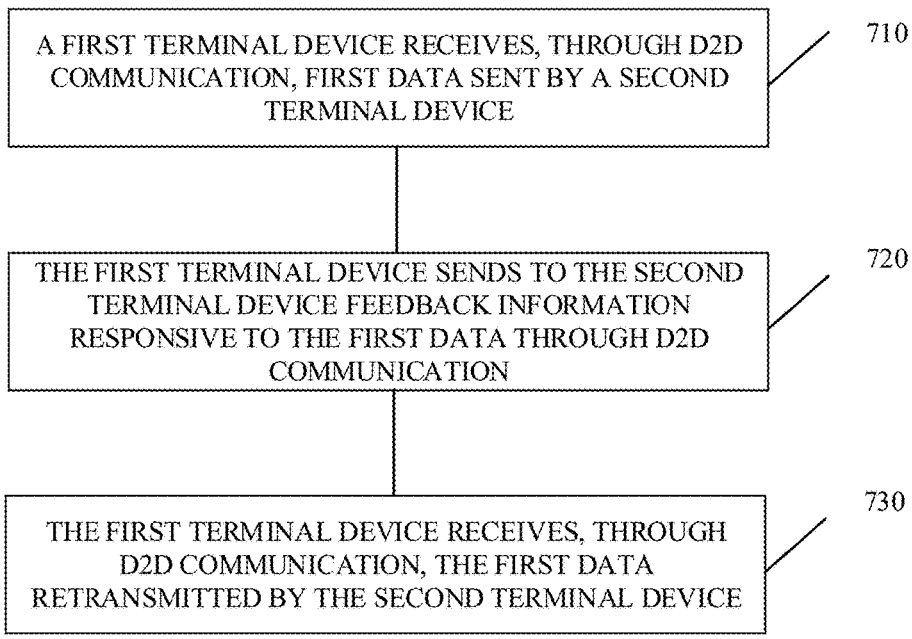
FIG. 7 is a schematic flowchart of a method for data retransmission according to other implementations.

FIG. 7 is a schematic flowchart of a method for data retransmission according to other implementations. The method illustrated in FIG. 7 includes some or all of the following operations.

At block 710, a first terminal device receives, through D2D communication, first data sent by a second terminal device.

At block 720, the first terminal device sends to the second terminal device feedback information responsive to the first data through D2D communication.

At block 730, the first terminal device receives, through D2D communication, the first data retransmitted by the second terminal device.

Figure 8:
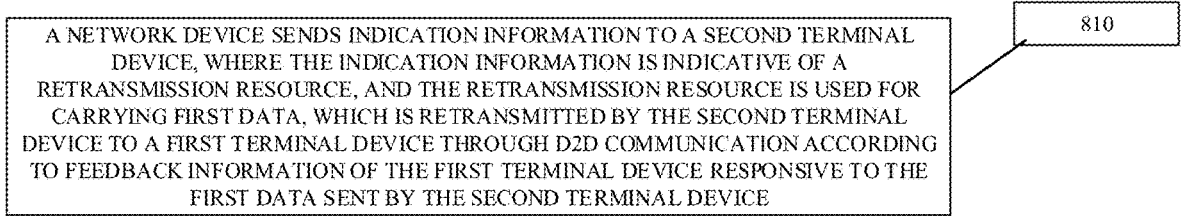
FIG. 8 is a schematic flowchart of a method for data retransmission according to other implementations.

FIG. 8 is a schematic flowchart of a method for data retransmission according to other implementations. The method illustrated in FIG. 8 includes some or all of the following operations.

At block 810, a network device sends indication information to a second terminal device, where the indication information is indicative of a retransmission resource, and the retransmission resource is used for carrying first data, which is retransmitted by the second terminal device to a first terminal device through D2D communication according to feedback information of the first terminal device responsive to the first data sent by the second terminal device.

In some implementations, the feedback information includes at least one of: an ACK message, a NACK message, and discontinuous transmission (DTX).

The following will describe in detail the methods illustrated in FIG. 6, FIG. 7, and FIG. 8.

The second terminal device can determine, according to the feedback information of the first terminal device responsive to the first data, whether to retransmit the first data to the first terminal device.

If the first terminal device feeds back ACK information, it indicates that the first terminal device has received the first data successfully. The second terminal device does not have to retransmit the first data to the first terminal device, which is possible to reduce waste of resources.

If the first terminal device feeds back NACK information or the DTX, it indicates that the first terminal device has not received the first data. The second terminal device can retransmit the first data to the first terminal device, which is conducive to reliability of communication.

As an example, before the second terminal device retransmits the first data to the first terminal device on the retransmission resource, the second terminal device may receive NACK feedback information sent by the first terminal device, or the second terminal device may fail to receive, within a preset time period, the feedback information sent by the first terminal device.

When the feedback information received by the second terminal device is ACK, it indicates that the first terminal device has received the first data successfully. In this case, the second terminal device does not have to retransmit the first data, and the first terminal device does not have to obtain the retransmission resource.

When the feedback information received by the second terminal device is NACK or the DTX, it indicates that the first terminal device has not received the first data. In this case, the second terminal device needs to retransmit the first data to the first terminal device. Before retransmitting the first data, the second terminal device needs to obtain the retransmission resource.

When the second terminal device has not received, within the preset time period, the feedback information sent by the first terminal device, the second terminal device can consider that first terminal device has not received the first data. The second terminal device can retransmit the first data to the first terminal device on the retransmission resource.

The manner in which the second terminal device obtains the retransmission resource can be various. For example, the second terminal device can obtain the retransmission resource according to indication of the network device. For another example, the second terminal device can obtain the retransmission resource through autonomous resource selection.

"The second terminal device obtains the retransmission resource according to the indication of the network device" may be that the second terminal device receives indication information sent by the network device and obtains the retransmission resource according to the indication information.

"The network device indicates the retransmission resource" means that the network device directly indicates the retransmission resource, or means that the network device indicates the retransmission resource to the second terminal device after the second terminal device sends a resource request message to the network device.

As an example, the second terminal device can determine, according to the feedback information received from the first terminal device, whether to send the resource request message to the network device. For example, when the feedback information sent by the first terminal device is ACK, the second terminal device does not have to send the resource request message to the network device to request the retransmission resource. When the feedback information sent by the first terminal device is NACK, the second terminal device can send the resource request message to the network device to request the retransmission resource. When the second terminal device has not received the feedback information sent by the first terminal device, the second terminal device can also send the resource request message to the network device to request the retransmission resource.

In some implementations, the resource request message may include the feedback information sent by the first terminal device to the second terminal device. In other words, the second terminal device can report to the network device the feedback information sent by the first terminal device. In response to the resource request message, the network device can indicate the retransmission resource to the second terminal device.

In other implementations, the resource request message may include time information and/or frequency information of a resource requested by the second terminal device. In this case, the indication information sent by the network device may be an ACK message/NACK message, where ACK message indicates that the resource requested by the second terminal device can be used for retransmission, and the NACK message indicates that the resource requested by the second terminal device cannot be used for retransmission. The second terminal device, upon receiving the NACK message, can resend the resource request message to the network device, or the network device can directly indicate an available retransmission resource to the second terminal device.

In some implementations, a resource used for sending the resource request message is a resource indicated by the network device. For example, the network device can indicate to the second terminal device the resource used for sending the resource request message while indicating to the second terminal device a resource used for sending the first data. In some implementations, a retransmission resource indicated by the network device is indicated by the network device in control information which is indicative of the resource used for sending the first data by the second terminal device.

In some implementations, the resource used for sending the resource request message by the second terminal device is a PUCCH or a physical uplink shared channel (PUSCH).

In some implementations, the resource request message is carried in a scheduling request (SR) message in the PUCCH, an ACK message/NACK message in the PUCCH, a MAC CE, or RRC signaling.

The manner in which the second terminal device obtains the retransmission resource through resource contention may be various. For example, an LBT mode may be adopted for resource contention. When the first terminal device senses that a feedback resource is in an idle state, the first terminal device can use the feedback resource to send the feedback information. When the first terminal device senses that the feedback resource is occupied, the first terminal device cannot use the feedback resource to send the feedback information. For another example, resource contention can be carried out in the manner of obtaining resources in IoV mode 4 of Rel-14 and Rel-15. When the first terminal device senses that a transmission resource is available, the first terminal device can use the transmission resource to send the feedback information. When the first terminal device senses that the transmission resource is occupied, the first terminal device cannot use the transmission resource to send the feedback information.

According to implementations, after the second terminal device obtains the retransmission resource according to the indication of the network device, the second terminal device can determine, through resource contention, whether the retransmission resource can be used. If resource contention succeeds, the second terminal device uses the retransmission resource for retransmission. If resource contention fails, the second terminal device cannot use the retransmission resource to retransmit data.

According to implementations, before the first terminal device sends the feedback information to the second terminal device, for the manner in which the first terminal device obtains the feedback resource, reference can be made to the foregoing description, which will not be repeated herein to avoid repetition.

Figure 9:
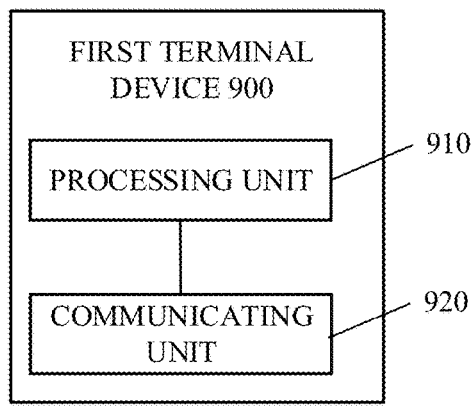
FIG. 9 is a schematic block diagram of a first terminal device according to implementations.

FIG. 9 is a schematic block diagram of a first terminal device according to implementations. As illustrated in FIG. 9, the first terminal device 900 includes a processing unit 910 and a communicating unit 920. The processing unit 910 is configured to obtain a feedback resource according to first indication information, where the feedback resource is used for carrying feedback information of the first terminal device responsive to a first message sent by a second terminal device. The communicating unit 920 is configured to send feedback information to the second terminal device on the feedback resource through D2D communication.

In some implementations, the communicating unit 920 is further configured to receive the first indication information sent by the second terminal device.

In some implementations, the processing unit 910 is further configured to pre-configure the first indication information.

In other implementations, the communicating unit 920 is further configured to receive the first indication information sent by a network device.

In some implementations, the first indication information is indicative of time information and/or frequency information of the feedback resource.

In other implementations, the first indication information is indicative of an available feedback resource set. The processing unit 910 is configured to select the feedback resource from the feedback resource set.

In some implementations, the communicating unit 920 is further configured to send a resource request message to the network device.

In some implementations, the resource request message includes time information and/or frequency information of a feedback resource requested by the first terminal device.

In some implementations, the resource request message is carried in a PUCCH, a MAC CE, or RRC signaling.

In some implementations, the processing unit 910 is further configured to obtain the feedback resource through autonomous resource selection.

In some implementations, the feedback resource takes time and/or frequency of the second terminal device as a synchronization reference.

In other implementations, the feedback resource takes time and/or frequency of the network device as a synchronization reference.

In other implementations, the feedback resource takes time and/or frequency of a GNSS as a synchronization reference.

In some implementations, the feedback information includes at least one of: ACK information, NACK information, channel quality information, power control information, and a multiple antenna scheme.

In some implementations, the first message includes data information, control information, or a reference signal sent by the second terminal device to the first terminal device.

Figure 10:
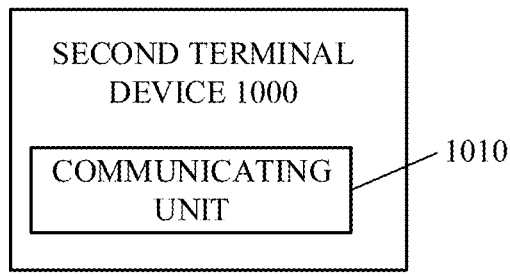
FIG. 10 is a schematic block diagram of a second terminal device according to implementations.

FIG. 10 is a schematic block diagram of a second terminal device according to implementations. As illustrated in FIG. 10, the second terminal device 1000 includes a communicating unit 1010. The communicating unit 1010 is configured to send a first message to a first terminal device through D2D communication, and send first indication information to the first terminal device, where the first indication information is indicative of a feedback resource, and the feedback resource is a resource used for sending, by the first terminal device, to the second terminal device feedback information responsive to the first message through D2D communication.

In some implementations, the communicating unit 1010 is further configured to receive second indication information sent by a network device, where the second indication information is indicative of the feedback resource. The second terminal device further includes a processing unit. The processing unit is configured to generate the first indication information according to the second indication information.

In some implementations, the first indication information is indicative of time information and/or frequency information of the feedback resource.

In some implementations, the feedback resource takes time and/or frequency of the second terminal device as a synchronization reference.

In other implementations, the feedback resource takes time and/or frequency of the network device as a synchronization reference.

In other implementations, the feedback resource takes time and/or frequency of a GNSS as a synchronization reference.

In some implementations, the feedback information includes at least one of: ACK information, NACK information, channel quality information, power control information, and a multiple antenna scheme.

In some implementations, the first message includes data information, control information, or a reference signal sent by the second terminal device to the first terminal device.

Figure 11:
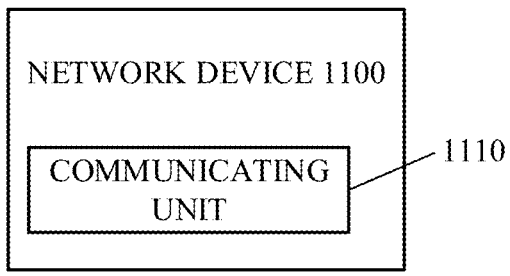
FIG. 11 is a schematic block diagram of a network device according to implementations.

FIG. 11 is a schematic block diagram of a network device according to implementations. As illustrated in FIG. 11, the network device 1100 includes a communicating unit 1110. The communicating unit 1110 is configured to send first indication information to a first terminal device, where the first indication information is indicative of a feedback resource, and the feedback resource is used for carrying feedback information, which is responsive to a first message sent by a second terminal device and is sent by the first terminal device to the second terminal device through D2D communication.

In some implementations, the communicating unit 1110 is further configured to receive a resource request message sent by the first terminal device.

In some implementations, the resource request message includes time information and/or frequency information of a feedback resource requested by the first terminal device.

In some implementations, the resource request message is carried in a PUCCH, a MAC CE, or RRC signaling.

In some implementations, the feedback resource takes time and/or frequency of the second terminal device as a synchronization reference.

In other implementations, the feedback resource takes time and/or frequency of the network device as a synchronization reference.

In other implementations, the feedback resource takes time and/or frequency of a GNSS as a synchronization reference.

In some implementations, the feedback information includes at least one of: ACK information, NACK information, channel quality information, power control information, and a multiple antenna scheme.

In some implementations, the first message includes data information, control information, or a reference signal sent by the second terminal device to the first terminal device.

Figure 12:
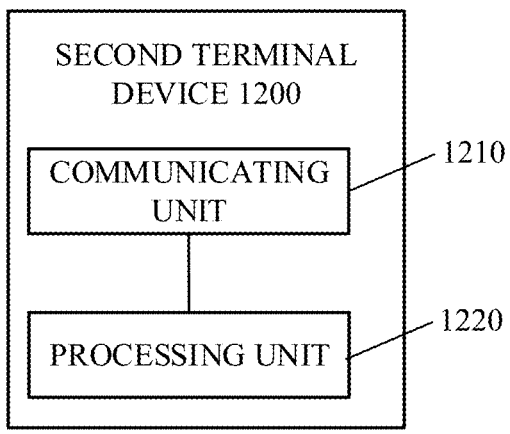
FIG. 12 is a schematic block diagram of a second terminal device according to other implementations.

FIG. 12 is a schematic block diagram of a second terminal device according to other implementations. As illustrated in FIG. 12, the second terminal device 1200 includes a communicating unit 1210 and a processing unit 1220. The communicating unit 1210 is configured to send first data to a first terminal device through D2D communication. The processing unit 1220 is configured to obtain a retransmission resource. The communicating unit 1210 is further configured to retransmit the first data to the first terminal device on the retransmission resource through D2D communication, according to feedback information of the first terminal device responsive to the first data.

In some implementations, the processing unit 1220 is configured to obtain the retransmission resource according to indication information sent by a network device.

In some implementations, the communicating unit 1210 is further configured to send a resource request message to the network device.

In some implementations, the communicating unit 1210 is configured to send the resource request message to the network device, according to the feedback information of the first terminal device responsive to the first data.

In some implementations, the resource request message includes the feedback information of the first terminal device responsive to the first data.

In some implementations, the resource request message includes time information and/or frequency information of a retransmission resource requested by the second terminal device.

In some implementations, the feedback information includes at least one of: an ACK message, a NACK message, and DTX.

In some implementations, a resource used for sending the resource request message is a resource indicated by the network device.

In some implementations, the resource indicated by the network device is indicated by the network device in control information which is indicative of a resource used for sending the first data by the second terminal device.

In some implementations, the resource used for sending the resource request message is a PUCCH or a PUSCH.

In some implementations, the resource request message is carried in an SR message in the PUCCH, an ACK message/NACK message in the PUCCH, a MAC CE, or RRC signaling.

In some implementations, the resource request message is carried in a BSR.

In some implementations, the communicating unit 1210 is further configured to obtain the retransmission resource through autonomous resource selection.

Figure 13:
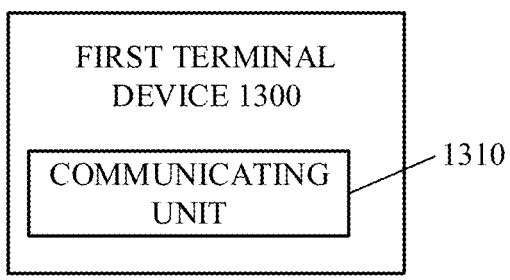
FIG. 13 is a schematic block diagram of a first terminal device according to other implementations.

FIG. 13 is a schematic block diagram of a first terminal device according to other implementations. As illustrated in FIG. 13, the first terminal device 1300 includes a communicating unit 1310. The communicating unit 1310 is configured to operate as follows. The communicating unit 1310 is configured to receive, through D2D communication, first data sent by a second terminal device. The communicating unit 1310 is configured to send to the second terminal device feedback information responsive to the first data through D2D communication. The communicating unit 1310 is configured to receive, through D2D communication, the first data retransmitted by the second terminal device.

In some implementations, the feedback information includes at least one of: an ACK message, a NACK message, and DTX.

Figure 14:
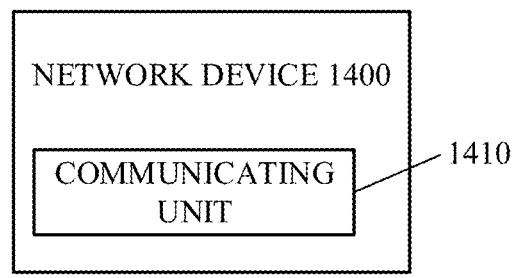
FIG. 14 is a schematic block diagram of a network device according to other implementations.

FIG. 14 is a schematic block diagram of a network device according to other implementations. As illustrated in FIG. 14, the network device 1400 includes a communicating unit 1410. The communicating unit 1410 is configured to send indication information to a second terminal device, where the indication information is indicative of a retransmission resource, and the retransmission resource is used for carrying first data, which is retransmitted by the second terminal device to a first terminal device through D2D communication according to feedback information of the first terminal device responsive to the first data sent by the second terminal device.

In some implementations, the communicating unit 1410 is further configured to receive a resource request message sent by the second terminal device.

In some implementations, the resource request message includes the feedback information of the first terminal device responsive to the first data.

In some implementations, the resource request message includes time information and/or frequency information of a retransmission resource requested by the second terminal device.

In some implementations, the feedback information includes at least one of: an ACK message, a NACK message, and DTX.

In some implementations, the communicating unit 1410 is further configured to send to the second terminal device indication information indicative of a resource used for sending the resource request message.

In some implementations, the resource used for sending the resource request message indicated by the network device is indicated by the network device in control information which is indicative of a resource used for sending the first data by the second terminal device.

In some implementations, the resource used for sending the resource request message is a PUCCH or a PUSCH.

In some implementations, the resource request message is carried in an SR message in the PUCCH, an ACK message/NACK message in the PUCCH, a MAC CE, and RRC signaling.

In some implementations, the resource request message is carried in a BSR.

Figure 15:
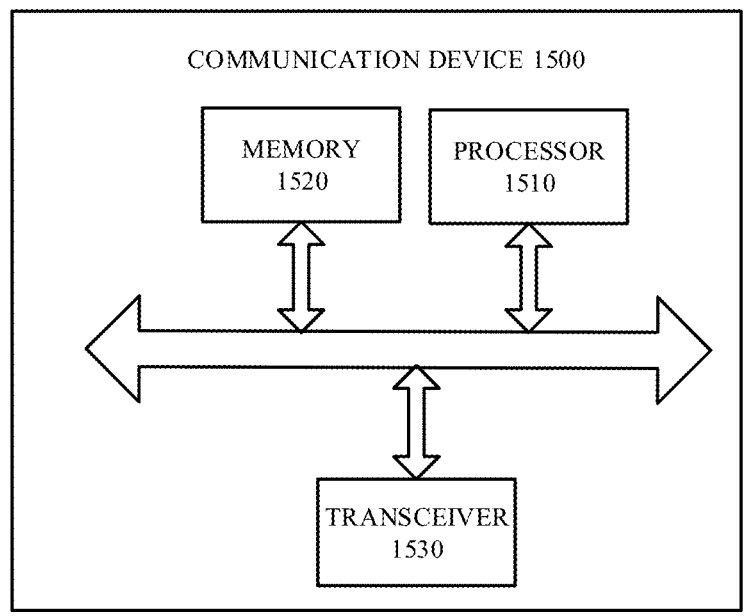
FIG. 15 is a schematic block diagram of a communication device according to implementations.

FIG. 15 is a schematic block diagram of a communication device 1500 according to implementations. As illustrated in FIG. 15, the communication device 1500 includes a processor 1510. The processor 1510 can invoke and execute computer programs stored in a memory to perform the method provided in implementations.

As illustrated in FIG. 15, the communication device 1500 can further include the memory 1520. The processor 1510 can invoke and execute the computer programs stored in the memory 1520 to perform the method provided in implementations.

The memory 1520 may be a separate device independent of the processor 1510, or may be integrated into the processor 1510.

As illustrated in FIG. 15, the communication device 1500 can further include a transceiver 1530. The processor 1510 can control the transceiver 1530 to communicate with other devices, for example, to send information or data to other devices, or to receive information or data from other devices.

The transceiver 1530 may include a transmitter and a receiver. The transceiver 1530 may further include an antenna, where one or more antenna can be provided.

The communication device 1500 may be the terminal device of implementations, and the communication device 1500 can implement the operations performed by the terminal device described in the foregoing method implementations, which will not be repeated herein for the sake of simplicity.

Alternatively, the communication device 1500 may be the network device of implementations, and the communication device 1500 can implement the operations performed by the network device described in the foregoing method implementations, which will not be repeated herein for the sake of simplicity.

Figure 16:
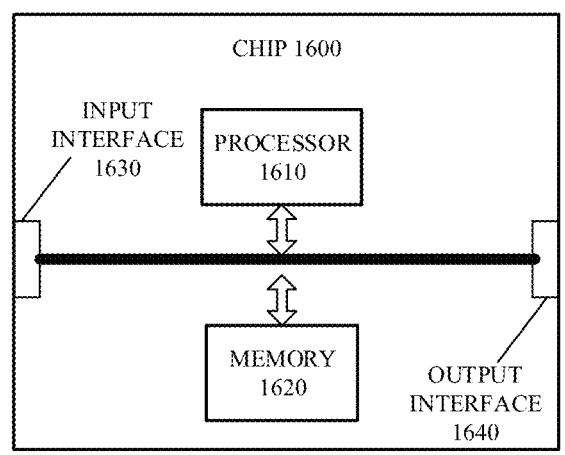
FIG. 16 is a schematic block diagram of a chip according to implementations.

FIG. 16 is a schematic structural diagram of a chip according to implementations. As illustrated in FIG. 16, the chip 1600 includes a processor 1610. The processor 1610 is configured to invoke and execute computer programs stored in a memory to perform the method provided in implementations.

As illustrated in FIG. 16, the chip 1600 further includes the memory 1620. The processor 1610 can invoke and execute the computer programs stored in the memory 1620 to perform the method provided in implementations.

The memory 1620 may be a separate device independent of the processor 1610, or may be integrated into the processor 1610.

The chip 1600 may further include an input interface 1630. The processor 1610 can control the input interface 1630 to communicate with other devices or chips, for example, to acquire information or data sent by other devices or chips.

The chip 1600 may further include an output interface 1640. The processor 1610 can control the output interface 1640 to communicate with other devices or chips, for example, to output information or data to other devices or chips.

The chip is applicable to the terminal device of implementations, and the chip can implement the operations performed by the terminal device described in the foregoing method implementations, which will not be repeated herein for the sake of simplicity.

Alternatively, the chip is applicable to the network device of implementations, and the chip can implement the operations performed by the network device described in the foregoing method implementations, which will not be repeated herein for the sake of simplicity.

It should be understood that, the chip herein may also be referred to as a system-on-chip (SOC).

It should be understood that, the processor referred to herein may be an integrated circuit chip with signal processing capabilities. During implementation, each step of the foregoing method may be completed by an integrated logic circuit in the form of hardware or an instruction in the form of software in the processor. The processor may be a general-purpose processor, a digital signal processor (DSP), an application specific integrated circuit (ASIC), a field programmable gate array (FPGA), or other programmable logic devices, discrete gates or transistor logic devices, or discrete hardware components, which can implement or execute the methods, steps, and logic blocks disclosed in implementations. The general purpose processor may be a microprocessor, or the processor may be any conventional processor or the like. The steps of the method disclosed in implementations may be implemented through a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware of the processor.

It can be understood that, the memory according to implementations may be a volatile memory or a non-volatile memory, or may include both the volatile memory and the non-volatile memory. The non-volatile memory may be a ROM, a PROM, an erasable programmable read only memory (erasable PROM, EPROM), an electrically erasable programmable read only memory (electrically EPROM, EEPROM), or flash memory. The volatile memory can be a RAM that acts as an external cache. By way of example but not limitation, many forms of RAM are available, such as a static random access memory (static RAM, SRAM), a dynamic random access memory (dynamic RAM, DRAM), a synchronous dynamic random access memory (synchronous DRAM, SDRAM), a double data rate SDRAM (DDR SDRAM), an enhanced SDRAM (ESDRAM), a synchronous link dynamic random access memory (synch-link DRAM, SLDRAM), and a direct rambus random access memory (direct rambus RAM, DRRAIVI). The memory of the systems and methods described herein is intended to include, but is not limited to, these and any other suitable types of memory.

It should be understood that, the above description of the memory is intended for illustration rather than limitation. For example, the memory of implementations may also be an SRAM, a DRAM, an SDRAM, a DDR SDRAM, an ESDRAM, an SLDRAM, a DR RAM, etc.

In other words, the memory of implementations is intended to include, but is not limited to, these and any other suitable types of memory.

Figure 17:
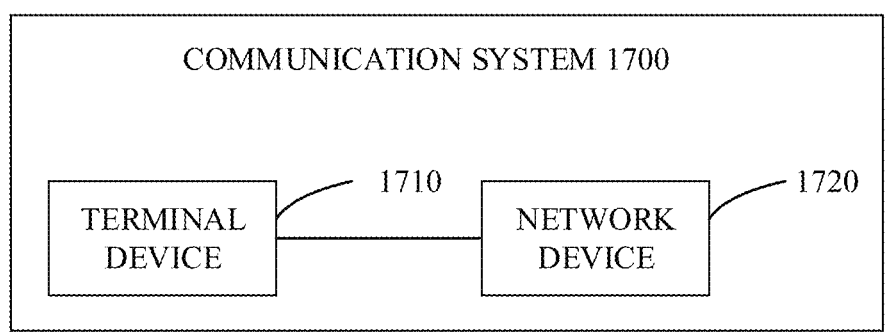
FIG. 17 is a schematic block diagram of a communication system according to implementations.

FIG. 17 is a schematic block diagram of a communication system 1700 according to implementations. As illustrated in FIG. 17, the communication system 1700 includes a terminal device 1710 and a network device 1720.

The terminal device 1710 can implement functions of the terminal device described in the foregoing method implementations, which will not be repeated herein for the sake of simplicity.

The network device 1720 can implement functions of the network device described in the foregoing method implementations, which will not be repeated herein for the sake of simplicity.

Implementations further provide a computer readable storage medium. The computer readable storage medium is configured to store computer programs. The computer readable storage medium is applicable to the network device. The computer programs, when executed, are operable with a computer to implement the operations performed by the network device described in the foregoing method implementations, which will not be repeated herein for the sake of simplicity. Alternatively, the computer readable storage medium is applicable to the terminal device of implementations. The computer programs, when executed, are operable with a computer to implement the operations performed by the terminal device described in the foregoing method implementations, which will not be repeated herein for the sake of simplicity.

Implementations further provide a computer program product. The computer program product includes computer program instructions. The computer program product is applicable to the network device of implementations. The computer program instructions, when executed, are operable with a computer to implement the operations performed by the network device described in the foregoing method implementations, which will not be repeated herein for the sake of simplicity. Alternatively, the computer program product is applicable to the terminal device of implementations. The computer program instructions, when executed, are operable with a computer to implement the operations performed by the terminal device described in the foregoing method implementations, which will not be repeated herein for the sake of simplicity.

Implementations further provide a computer program. The computer program is applicable to the network device of implementations. The computer program, when executed by a computer, is operable with the computer to implement the operations performed by the network device described in the foregoing method implementations, which will not be repeated herein for the sake of simplicity. Alternatively, the computer program is applicable to the terminal device of implementations. The computer program, when executed by a computer, is operable with the computer to implement the operations performed by the terminal device described in the foregoing method implementations, which will not be repeated herein for the sake of simplicity.

It should be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein, unless otherwise specified, generally indicates that the associated objects are in an "or" relationship.

In addition, according to implementations, "B corresponding to (which corresponds to) A" means that B is associated with A, and B can be determined according to A. However, "B can be determined according to A" does not mean that B can be determined only according to A, and instead, B can also be determined according to A and/or other information.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above method implementations, which will not be repeated herein.

It will be appreciated that the systems, apparatuses, and methods disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure.

Various functional units described in implementations herein may be integrated into one processing unit or may be present as a number of physically separated units, and two or more units may be integrated into one.

If the integrated units are implemented as software functional units and sold or used as standalone products, they may be stored in a computer readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations. The above storage medium may include various kinds of media that can store program codes, such as a universal serial bus (USB) flash disk, a mobile hard drive, a ROM, a RAM, a magnetic disk, or an optical disk.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for data retransmission, comprising:
   sending first data, by a second terminal device, to a first terminal device through device to device (D2D) communication;
   receiving, by the second terminal device, feedback information of the first terminal device responsive to the first data, wherein the feedback information comprises a negative acknowledgment (NACK) message;
   sending, by the second terminal device, a resource request message to a network device, according to the feedback information of the first terminal device responsive to the first data, wherein the resource request message is used for requesting a retransmission resource; and
   obtaining the retransmission resource by the second terminal device according to indication of the network device, wherein the retransmission resource is used for retransmitting the first data, by the second terminal device to the first terminal device;
   wherein a resource used for sending the resource request message by the second terminal device to the network device, is indicated by the network device in control information which is indicative of a resource used for sending the first data by the second terminal device, wherein the resource request message comprises the feedback information of the first terminal device responsive to the first data;
   wherein the method further comprises:
   resending the resource request message, by the second terminal device, to the network device, when the second terminal device receives another NACK message, from the network device, which indicates that the resource requested by the second terminal device cannot be used for retransmission.

2. The method of claim 1, wherein the method further comprises:
   retransmitting the first data, by the second terminal device, to the first terminal device on the retransmission resource through D2D communication, according to the feedback information of the first terminal device responsive to the first data.

3. The method of claim 1, wherein the resource request message comprises at least one of time information and frequency information of a retransmission resource requested by the second terminal device.

4. The method of claim 1, wherein the feedback information further comprises at least one of: channel quality information, power control information, and a multiple antenna scheme.

5. The method of claim 1, wherein the resource used for sending the resource request message is one of a physical uplink control channel (PUCCH) and a physical uplink shared channel (PUSCH).

6. The method of claim 1, wherein the resource request message is carried in one of a scheduling request (SR) message in a PUCCH, an ACK message/NACK message in the PUCCH, a MAC control element, and radio resource control (RRC) signaling.

7. The method of claim 1, wherein the method further comprises:
receiving an available retransmission resource directly indicated by the network device by the second terminal device, when the second terminal device receives another NACK message, from the network device, which indicates that the resource requested by the second terminal device cannot be used for retransmission.

8. A terminal device, comprising:
at least one processor;
a transceiver; and
a memory storing instructions which, when executed by the at least one processor, cause the transceiver to:
send a first message to a first terminal device through device to device (D2D) communication;
receive feedback information of the first terminal device responsive to the first message, wherein the feedback information comprises a negative acknowledgment (NACK) message;
send a resource request message to a network device, according to the feedback information of the first terminal device responsive to first data, wherein the resource request message is used for requesting a retransmission resource; and
obtain the retransmission resource according to indication of the network device, wherein the retransmission resource is used for retransmitting the first data to the first terminal device;
wherein a resource used for sending the resource request message to the network device, is indicated by the network device in control information which is indicative of a resource used for sending the first message, wherein the resource request message comprises the feedback information of the first terminal device responsive to the first data;
wherein the instructions when executed by the at least one processor, further cause the transceiver to:
resend the resource request message to the network device when receiving another NACK message, from the network device, which indicates that the resource requested by the second terminal device cannot be used for retransmission.

9. The terminal device of claim 8, wherein:
the transceiver is further configured to send first indication information to the first terminal device, wherein the first indication information is indicative of a feedback resource, and the feedback resource is a resource used for sending, by the first terminal device, to the terminal device the feedback information responsive to the first message through D2D communication;
the transceiver is further configured to receive second indication information sent by the network device, wherein the second indication information is indicative of the feedback resource; and
the at least one processor is configured to generate the first indication information according to the second indication information.

10. The terminal device of claim 9, wherein the first indication information is indicative of at least one of time information and frequency information of the feedback resource.

11. The terminal device of claim 8, wherein the feedback resource takes at least one of time and frequency of the terminal device as a synchronization reference.

12. The terminal device of claim 8, wherein the feedback resource takes at least one of time and frequency of the network device as a synchronization reference.

13. The terminal device of claim 8, wherein the feedback resource takes at least one of time and frequency of a global navigation satellite system (GNSS) as a synchronization reference.

14. The terminal device of claim 8, wherein the feedback information further comprises at least one of: channel quality information, power control information, and a multiple antenna scheme.

15. The terminal device of claim 8, wherein the first message comprises one of data information, control information, and a reference signal sent by the terminal device to the first terminal device.

16. The terminal device of claim 8, wherein the instructions when executed by the at least one processor, further cause the transceiver to:
retransmit the first message to the first terminal device on the retransmission resource through D2D communication, according to feedback information of the first terminal device.

17. The terminal device of claim 8, wherein the instructions when executed by the at least one processor, further cause the transceiver to:
receive an available retransmission resource directly indicated by the network device when receiving another NACK message, from the network device, which indicates that the resource requested from the network device cannot be used for retransmission.

18. A non-transitory computer readable storage medium, configured to store computer programs which, when executed, are operable with a computer to:
send first data to a first terminal device through device to device (D2D) communication;
receive feedback information of the first terminal device responsive to the first data, wherein the feedback information comprises a negative acknowledgment (NACK) message;
send a resource request message to a network device, according to the feedback information of the first terminal device responsive to the first data, wherein the resource request message is used for requesting a retransmission resource; and
obtain a retransmission resource according to indication of the network device, wherein the retransmission resource is used for retransmitting the first data to the first terminal device;
wherein a resource used for sending the resource request message to the network device, is indicated by the network device in control information which is indicative of a resource used for sending the first data by a second terminal device, wherein the resource request message comprises the feedback information of the first terminal device responsive to the first data;

wherein the computer programs when executed, are further operable with the computer to:

resend the resource request message to the network device when receiving another NACK message, from the network device, which indicates that the resource requested by the second terminal device cannot be used for retransmission.

19. The non-transitory computer readable storage medium of claim 18, wherein the computer programs when executed, are further operable with the computer to:

retransmit the first message to the first terminal device on the retransmission resource through D2D communication, according to feedback information of the first terminal device.

* * * * *